(12) United States Patent
Lee et al.

(10) Patent No.: US 8,179,390 B2
(45) Date of Patent: May 15, 2012

(54) LIGHT EMITTING DISPLAY

(75) Inventors: Kyoung Soo Lee, Suwon (KR); Ki Myeong Eom, Suwon (KR); Jin Hyun Choi, Suwon (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 979 days.

(21) Appl. No.: 12/170,418

(22) Filed: Jul. 9, 2008

(65) Prior Publication Data

US 2008/0266282 A1 Oct. 30, 2008

Related U.S. Application Data

(62) Division of application No. 11/187,050, filed on Jul. 21, 2005.

(30) Foreign Application Priority Data

Jul. 28, 2004 (KR) .................. 10-2004-0059020
Jul. 28, 2004 (KR) .................. 10-2004-0059021

(51) Int. Cl.
 G06F 3/038 (2006.01)
(52) U.S. Cl. ............ 345/211; 345/76; 345/82; 345/204; 315/169.3
(58) Field of Classification Search ............ 345/63, 345/211, 76–84, 204; 315/169.3; 313/463
See application file for complete search history.

(56) References Cited

U.S. PATENT DOCUMENTS

| | | | |
|---|---|---|---|
| 5,621,439 A | 4/1997 | Okada et al. | |
| 6,611,107 B2 | 8/2003 | Mikami et al. | |
| 7,030,842 B2 | 4/2006 | Ha et al. | |
| 7,164,155 B2 * | 1/2007 | Yamazaki et al. | 257/84 |
| 7,557,779 B2 | 7/2009 | Tanada | |
| 2003/0168992 A1 | 9/2003 | Noguchi et al. | |
| 2003/0201955 A1 | 10/2003 | Song et al. | |
| 2003/0234800 A1 * | 12/2003 | Nakajima et al. | 345/690 |
| 2004/0004444 A1 | 1/2004 | Choi et al. | |
| 2005/0184672 A1 | 8/2005 | Lee | |

FOREIGN PATENT DOCUMENTS

WO WO 01/52327 A1 7/2001

OTHER PUBLICATIONS

U.S. Office action dated Jan. 12, 2010, for U.S. Appl. No. 11/187,050.
U.S. Office action dated Mar. 10, 2009, for U.S. Appl. No. 11/187,050.
U.S. Office action dated Sep. 22, 2008, for related U.S. Appl. No. 11/187,050.
U.S. Office action dated Jul. 29, 2009, for U.S. Appl. No. 11/187,050.

* cited by examiner

*Primary Examiner* — Lun-Yi Lao
*Assistant Examiner* — Shaheda Abdin
(74) *Attorney, Agent, or Firm* — Christie, Parker & Hale, LLP

(57) ABSTRACT

A light emitting display includes a substrate, a pixel area, a first power source line to supply a first power signal to each pixel on a first side of the pixel area, a second power source line to supply the first power signal to each pixel on a second side of the pixel area, and an impedance compensator for compensating a difference in a voltage drop between the first power source line and the second power source line. A voltage drop caused by line resistance that depends on the length of the first and second power source line that supply the first power signal to a lower and upper side of a pixel area, respectively, is equalized, thereby minimizing the voltage drop of the first power signal supplied to all pixels, and minimizing non-uniformity of brightness due to the voltage drop differences at each pixel.

4 Claims, 15 Drawing Sheets

LIGHT EMITTING DISPLAY

CROSS-REFERENCE TO RELATED APPLICATIONS

This application is a divisional application of U.S. patent application Ser. No. 11/187,050, filed on Jul. 21, 2005 which claims priority to and the benefit of Korean Patent Application Nos. 10-2004-0059020 and 10-2004-0059021, filed on Jul. 28, 2004, in the Korean Intellectual Property Office, the entire contents of which is incorporated herein by reference.

BACKGROUND

1. Field of the Invention

The present invention relates to a light emitting display, and more particularly, to a light emitting display in which a power supply line has a uniform voltage drop, thereby providing uniform display brightness.

2. Discussion of Related Art

Recently, various flat panel displays have been developed to replace cathode ray tube (CRT) displays, because CRT displays are relatively heavy and bulky. Flat panel displays include various types of light emitting display technologies including liquid crystal displays (LCDs), field emission displays (FEDs), plasma display panels (PDPs), and light emitting diode displays (LEDs).

Among the light emitting display types, only LED displays can generate light, which is done through electron-hole recombination that allows a fluorescent layer of the LED to emit light. Light emitting displays are categorized into inorganic displays and organic displays according to constituent materials and structures. Flat panel displays and light emitting displays, generally, can be categorized into passive displays and active displays according to the driving mechanism. Active displays (e.g., LED displays) have the benefit of a fast response time like CRT displays in contrast to passive display devices (e.g., LCDs), which require a separate light source.

FIG. 1 is a view of a conventional light emitting display.

Referring to FIG. 1, a conventional light emitting display includes a substrate 10; a pixel area 20 including a plurality of pixels 21 placed on an area defined by scan lines S, data lines D, and pixel power source lines VDD formed on the substrate 10; a scan driver 30; a data driver 40; a first power source line 50; a second power source line 52; and a pad hub 60.

The scan driver 30 is placed adjacent to one side of the image display (e.g. pixel area 20), and electrically connected to a set of pads Ps on the pad hub 60 through a scan control signal line 32. The scan driver 30 generates a scan signal along the scan control signal line 32 and transmits the scan signal to the scan lines S of the pixel area 20 in sequence. For this, the scan driver 30 includes a plurality of shift registers to generate the sequential scan signals in response a scan control signal.

The data driver 40 is electrically connected to a second set of pads Pd on the pad hub 60 through a first data signal line 42, and connected to the data line D through a second data signal line 44. The data driver 40 can be mounted to the substrate 10 by a chip-on-glass method, a wire-bonding method, a flip chip method, a beam lead method, or similar technique, or directly formed on the substrate 10. The data driver 40 receives a data signal and a data control signal transmitted from the second set of pads Pd, and supplies the data signal corresponding to one horizontal line per one horizontal period to the data lines D on the basis of the data control signal.

The first power source line 50 is formed adjacent to a top side of the pixel area 20 and commonly connected to the one side of the pixel power source line VDD. The first power source line 50 receives a first power signal from the third set pads Pvdd on the pad hub 60 through the first signal line 58 and supplies a first power signal to the pixel power source line VDD of each pixel 21.

The second power source line 52 is electrically connected to a cathode electrode of a light emitting device formed on the whole surface of the pixel area 20. The second power source line 52 receives a second power signal from the fourth set of pads Pvss through the second signal line 56, and supplies the second power signal to the cathode electrode of the light emitting device.

One side of the pixel power source line VDD is commonly connected to the first power source line 50. The pixel power source line VDD supplies the first power signal from the first power source line 50 to each pixel 21.

Thus, each pixel 21 is controlled by the scan signal S transmitted by the scan line S. Each pixel 21 emits light using the current supplied to the light emitting device from the pixel power source line VDD in correspondence with the data signal of the data line D, thereby displaying an image.

However, in the conventional light emitting display, the pixel power source lines VDD that are commonly connected to the first power source line 50 are different in length from one another, so that the line resistance of the pixel power source lines is non-uniform, thereby supplying the power signal with differences in voltage drop (IR drop) to the respective pixels 21. For example, the closer a pixel 21 is to the first power source line 50, the less the voltage drop of the pixel power source line VDD. On the other hand, as a pixel 21 gets farther away from the first power source line 50, the voltage drop of the pixel power source line VDD is increased. Thus, in the conventional light emitting display, the voltage drop of the pixel power source line VDD is non-uniform according to the positions of the pixel 21, so that the amount of current available at any given pixel 21 selected by the same data signal varies according to the position of the pixel 21, thereby causing non-uniform brightness.

SUMMARY OF THE INVENTION

Accordingly, it is an aspect of the present invention to provide a light emitting display in which a power source line has a uniform voltage drop, thereby providing uniform brightness.

A light emitting display includes: a substrate; a pixel area including a plurality of pixels defined by scan lines and data lines formed on the substrate; a first power source line to supply a first power signal to each pixel on a first side of the pixel area; a second power source line to supply the first power signal to each pixel on a second side of the pixel area; and an impedance compensator connected to at least one of the first power source line and the second power source line to compensate for the difference in the voltage drop between the first power source line and the second power source line.

Other embodiments include a light emitting display including: a substrate; a pixel area including a plurality of pixels defined by scan lines and data lines formed on the substrate; a first power source line to supply the first power signal to each pixel on a first side of the pixel area; a second power source line to supply the first power signal to each pixel on a second side of the pixel area; a plurality of pixel power source lines having a first end electrically connected to the first power source line and a second end electrically connected to the second power source line to supply the first power signal from the first power source line and the second power source line to each pixel; and an impedance compensator connected to at least one of the first power source line and the second power source line to compensate for the difference in a voltage drop between the first power source line and the second power source line.

Further embodiments include a light emitting display including: a pixel area formed on a substrate and including a plurality of pixels defined by scan lines and data lines; a first power source line to supply first power to each pixel on a first side of the pixel area; and a second power source line to supply the first power to each pixel on a second side of the pixel area, wherein the first power source line and the second power source line are different in line width from each other.

Further embodiments include a light emitting display including: a pixel area defined by scan lines and data lines formed on a substrate; a first power source line to supply first power signal to each pixel at a first side of the pixel area; and an second power source line to supply the first power signal to each pixel on a second side of the pixel area, wherein the first power source line and the second power source line have a different number of layers from one another.

An embodiment includes a light emitting display including: a pixel area formed on a substrate and defined by a plurality of pixels, scan lines and data lines; a first power source line to supply a first power signal to each pixel on a first side of the pixel area; and a second power source line to supply the first power signal to each pixel on a second side of the pixel area, wherein the first power source line and the second power source line are different in thickness from each other.

In one embodiment, a light emitting display including: a pixel area formed on a substrate and defined by a plurality of pixels, scan lines and data lines; a first power source line to supply a first power signal to each pixel on a first side of the pixel area; and an second power source line to supply the first power signal to each pixel on a second side of the pixel area, wherein the first power source line and the second power source line are different in resistance per unit length from each other.

DETAILED DESCRIPTION

Figure 1:
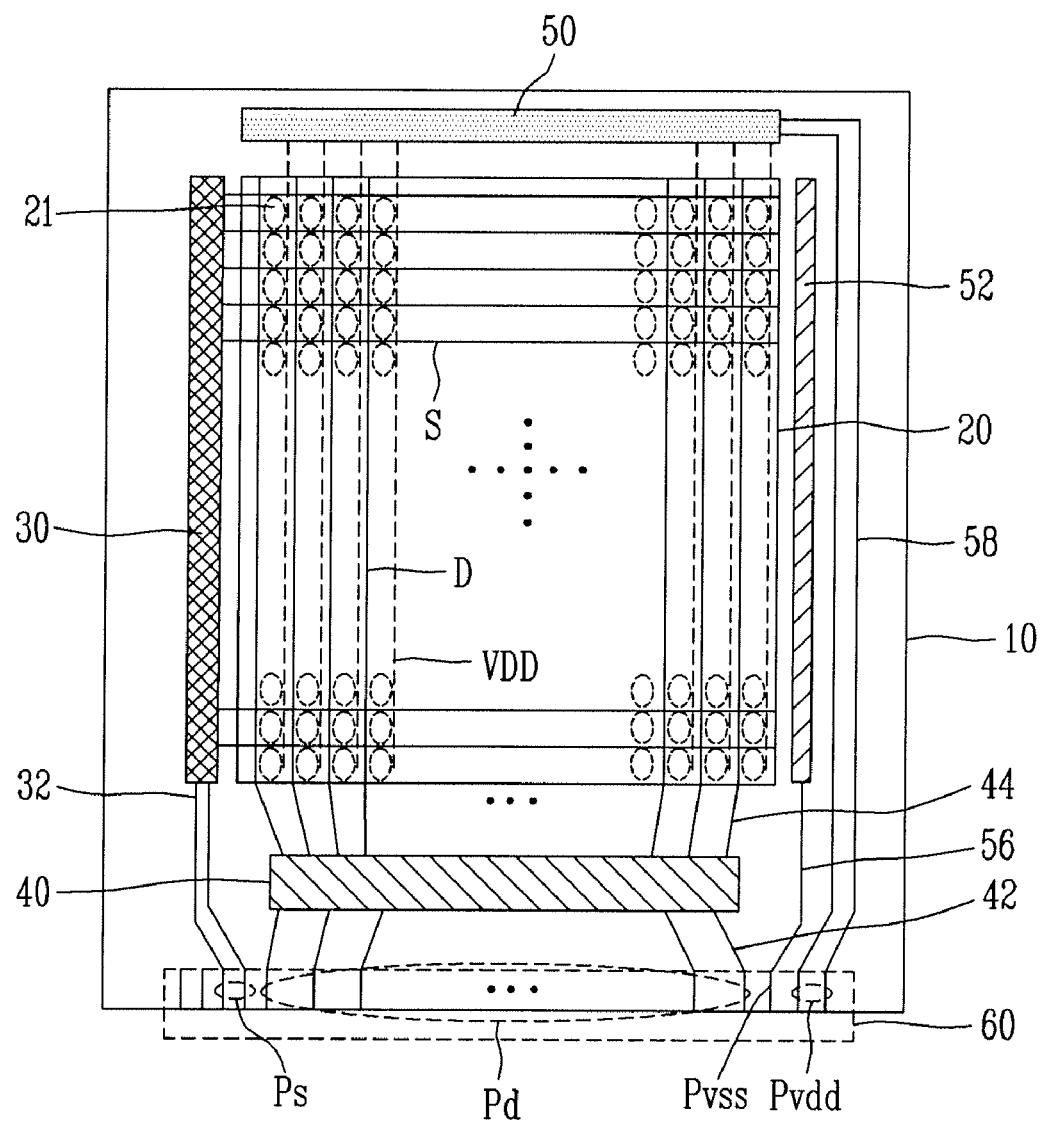
FIG. 1 is a view of a conventional light emitting display.
Figure 2:
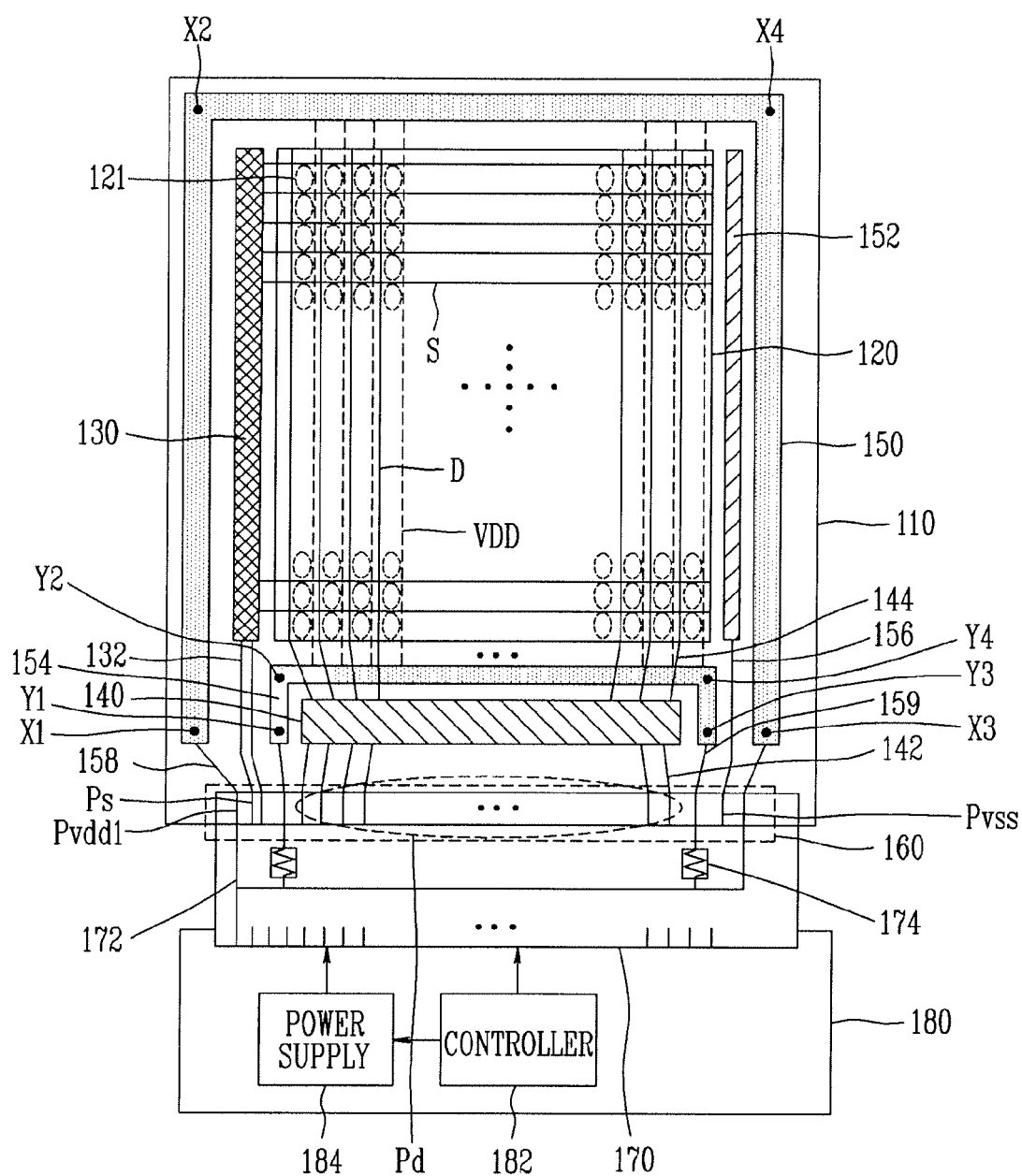
FIG. 2 is a view of a light emitting display according to a first embodiment of the present invention.

FIG. 2 is a view of a light emitting display according to a first embodiment of the present invention.

Referring to FIG. 2, a light emitting display according to the first embodiment of the present invention includes: a substrate 110; a pixel area 120 including a plurality of pixels 121, which are defined by data lines D and scan lines S formed on the substrate 110, a light emitting device; a pixel circuit for controlling the emission of light; a first power source line 150 placed on a first side of the pixel area 120 and supplying a first power signal to the pixel area 120; a second power source line 154 placed on a second side of the pixel area 120 and supplying the first power signal to the pixel area 120; a plurality of power source lines VDD electrically connected to both the first power source line 150 and the second power source line 154 and supplying the first power signal to each pixel 121; a second power source line 152 supplying a second power signal to the plurality of pixels 121; and an impedance compensator 174 that compensates on the first power source line 150 and the second power source line 154 for voltage drop (IR drop) differences.

Further, the light emitting display according to the first embodiment of the present invention includes a scan driver 130 that transmits a selection signal to the scan lines S; a data driver 140 transmitting a data signal to the data lines D; a pad hub 160 for receiving the data signal, a power voltage, a scan signal, and a data control signal from external sources; a control part 180 for transmitting the data signal, the scan signal, and the data control signal to the pad hub 160; and a flexible printed circuit (FPC) 170 connecting the control part 180 with the pad hub 160.

The pixel circuit is driven by the selection signal transmitted on the scan line S, which controls the amount of current applied from the power source line VDD to the light emitting device on the basis of the data signal transmitted on the data line D. Thus, each pixel 121 of the light emitting device emits light using the current supplied to the pixel circuit, thereby displaying a picture.

The light emitting device includes an anode electrode connected to the pixel circuit, and a cathode electrode connected to the second power source line 152. In one embodiment, the light emitting device may include an organic light emitting device such as a light emitting diode (LED).

The organic light emitting device (e.g. an organic LED or OLED) includes an emitting layer, an electron transport layer, and a hole transport layer, which are interposed between an anode electrode and a cathode electrode. Additionally, the light emitting display may include an electron injection layer, and a hole injection layer. In this light emitting display, when voltage is applied between the anode electrode and the cathode electrode, electrons generated from the cathode electrode are moved to the emitting layer via the electron injection layer and the electron transport layer, and holes generated from the anode electrode are moved to the emitting layer via the hole injection layer and the hole transport layer. Then, the electrons from the electron transport layer and the holes from the hole transport layer are recombined in the emitting layer, thereby emitting the light.

The control component 180 includes a controller 182, and a power supply 184 to generate voltages. The controller 182 generates a scan control signal to control drive timing of the scan driver 130, and a data control signal to control drive timing of the data driver 140. Further, the controller 182 transmits an external data signal to the data driver 140. Also, the controller 182 controls the power supply 184.

The power supply 184 generates a first power signal, a second power signal, and driving voltages needed for driving the data and scan drivers 140 and 130 in correspondence to the control signals of the controller 182. The second power signal has a voltage level lower than that of the first power signal. For example, the first power signal may have a ground level.

The FPC 170 is electrically connected to the pad hub of the control component 180 by an anisotropic conductive film, and connected to the pad hub 160 of the substrate 110. The FPC 170 is formed with signal lines thereon to transmit the data signal, the data control signal and the scan control signal from the controller 182 to the pad hub 160 of the substrate 110. Further, the FPC 170 is formed with a power supplying line 172 thereon to supply the first power signal from the power supply 184 to the pad hub 160 of the substrate 110. Also, the FPC 170 is formed with voltage lines thereon to supply the driving voltage for driving the data and scan drivers 140 and 130 and the second power signal from the power supply 184 to the pad hub 160 of the substrate 110.

The pad hub 160 includes a first set of pads Pvdd1 electrically connected to opposite terminals of the first power source line 150 through a first signal line 158; a second set of pads Pvdd2 electrically connected to opposite terminals of the second power source line 154 through a second signal line 159; a third set of pads Pvss electrically connected to the second power source line 152 through a third power source line 156; a fourth set of pads Ps electrically connected to the scan driver 130 through the scan control line 132; and a fifth set of pads Pd electrically connected to the data driver 140 through the first data signal line 142.

The first set of pads Pvdd1 is electrically connected to the power supplying line 172 formed on the FPC 170. Thus, the first set of pads Pvdd1 receives the first power signal from the power supply 184 through the FPC 170.

The second set of pads Pvdd2 is electrically connected to the power supplying line 172 formed on the FPC 170. Thus, the second set of pads Pvdd2 receives the first power signal from the power supply 184 through the FPC 170.

The impedance compensator 174 is formed between the pad of the FPC 170 electrically connected to the second set of pads Pvdd2 formed on the substrate 110 and the power supplying line 172 formed on the FPC 170. The impedance compensator 174 compensates the first power signal supplied from the power supplying line 172 to the second power source line 154 for the voltage drop by impedance. That is, the impedance compensator 174 compensates the first power signal supplied to the second power source line 154 for any difference in line resistance between the first power source line 150 and the second power source line 154, wherein the difference is due to a difference in length between the first and second power source lines 150 and 154.

The voltage drop is due to differences in the line resistance between a first point X1 (or X3) of the first power source line 150 adjacent to the first set of pads Pvdd1 on the pad hub 160 formed on the substrate 110 and a second point X2 (or X4) of the first power source line 150 formed on a upper side of the pixel area 120, which is called a first voltage drop $V_{IR1}$. Further, the voltage drop is due to a difference in the line resistance between a first point Y1 (or Y3) of the second power source line 154 adjacent to the second set of pads Pvdd2 on the pad hub 160 formed on the substrate 110 and a second point Y2 (or Y4) of the second power source line 154 formed on a lower side of the pixel area 120, which is called a second voltage drop $V_{IR2}$. Therefore, the impedance compensator 174 compensates for differences between the first voltage drop $V_{IR1}$ of the first power source line 150 and the second voltage drop $V_{IR2}$ of the second power source line 154 by impedance. Therefore, the first power signal supplied from the second point X2 (or X4) of the first power source line 150 to a first terminal of the plurality of pixels gets the same value as the first power signal supplied from the second point Y2 (or Y4) of the second power source line 154 to a second terminal of the plurality of pixel power source lines VDD.

The third set of pads Pvss receives the second power signal from the power supply 184 through the FPC 170. The fourth set of pads Ps receives the scan control signal from the controller 182 through the FPC 170. The fifth set of pads Pd receives the data control signal and the data signal from the controller 182 through the FPC 170.

The first power source line 150 is formed along edges of the substrate 110 except the pad hub 160. The first power source line 150 supplies the first power signal from the first set of pads Pvdd1 on the pad hub 160 to the plurality of pixel power source lines VDD.

The second power source line 154 is formed adjacent to the second side of the pixel area 120. The second power source line 154 supplies the first power signal received through the impedance compensator 174 and the second set of pads Pvdd2 on the pad hub 160 to the plurality of pixel power source lines VDD.

The plurality of pixel power source lines VDD has the first terminal commonly connected to the first power source line 150 adjacent to the upper side of the pixel area 120, and the second terminal commonly connected to the second power source line 154 adjacent to the lower side of the pixel area 120. Each pixel power source line VDD receives both the first power signal from the first power source line 150 and the first power signal compensated by the impedance compensator 174 from the second power source line 154, and supplies the first power signal to the pixels 121.

The second power source line 152 is electrically connected to the cathode electrode of the light emitting device formed on the whole of the pixel area 120. The second power source line 152 supplies the second power signal from the third set of pads Pvss on the pad hub 160 to the cathode electrode of the light emitting device.

The data driver 140 is disposed adjacent to the pad hub 160 formed on the substrate 110 and electrically connected to the fifth set of pads Pd and the data line D through the first and second data signal lines 142 and 144, respectively. Here, the data driver 140 can be mounted to the substrate 110 by a chip-on-glass method, a wire-bonding method, a flip chip method, a beam lead method, or similar technique or directly formed on the substrate 110. The data driver 140 receives the data signal and the data control signal transmitted from the fifth pad Pd, and supplies the data signal corresponding to one horizontal line per one horizontal period to the data lines D on the basis of the data control signal.

The scan driver 130 is formed between one side of the pixel area 120 and the first power source line 150, and electrically connected to the fourth set of pads Ps through the scan control signal line 132. The scan driver 130 generates the sequential selection signals in correspondence with the scan control signal transmitted from the fourth set of pads Ps through the scan control signal line 132, and supplies them to the scan lines S of the pixel area 120. For this, the scan driver 130 includes a plurality of shift registers to generate the sequential selection signals in response to the scan control signals.

Each pixel 121 includes pixel circuits electrically connected to the data line D, the scan line S, the pixel power source line VDD, and the light emitting device. The pixel circuit controls the amount of current supplied from the pixel power source line VDD to the light emitting device in response to the selection signal transmitted to the scan line S. Thus, the light emitting device of each pixel emits light based on the current supplied from the pixel circuit, thereby displaying an image.

Figure 3:
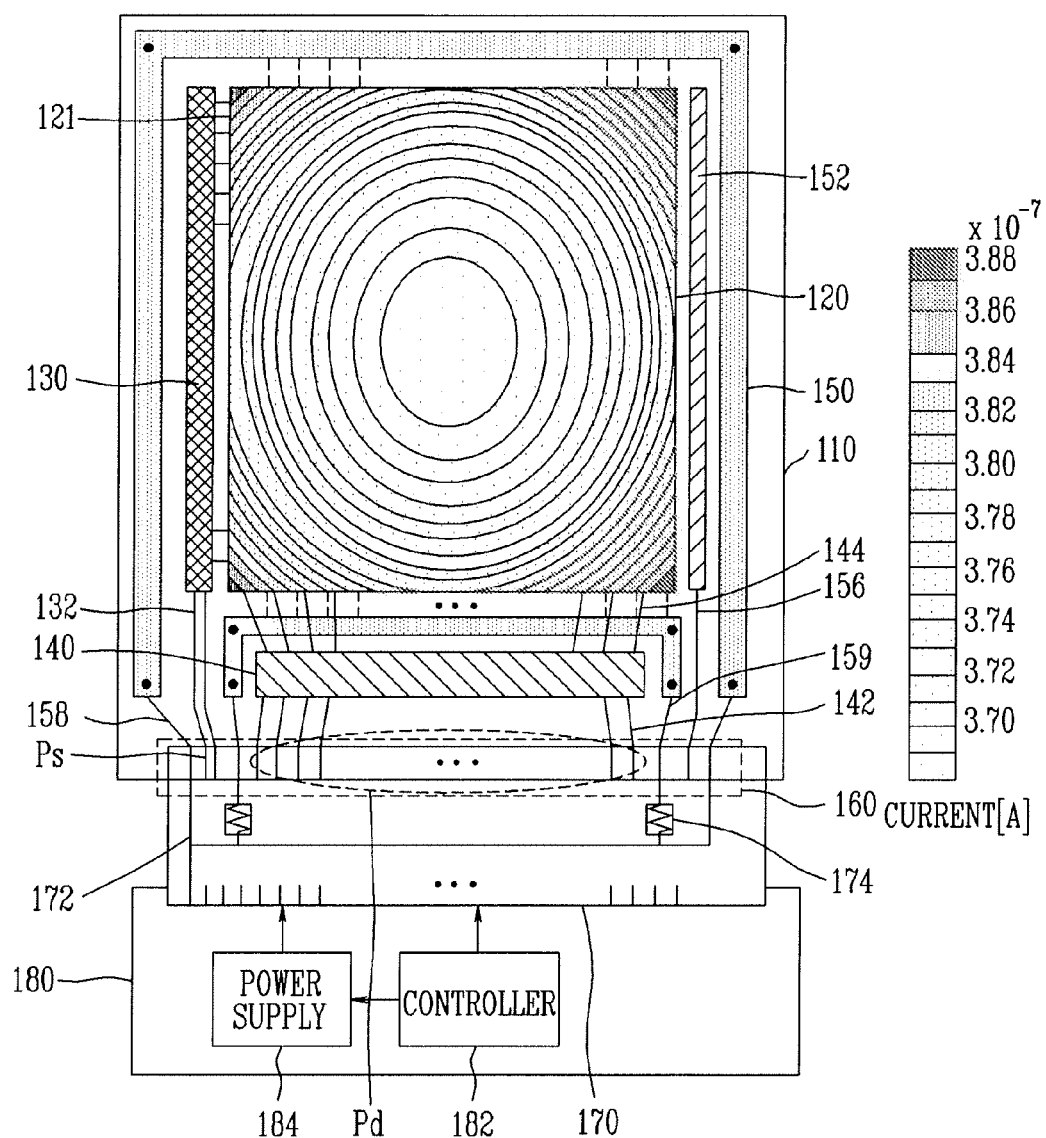
FIG. 3 is a view showing a current distribution of power according to the position of a pixel in the light emitting display according to the first embodiment of the present invention.

FIG. 3 is a view showing a current distribution according to a position of a pixel in the light emitting display according to the first embodiment of the present invention.

Referring to FIG. 3, the light emitting display according to the first embodiment of the present invention includes the impedance compensator 174 on the power supplying line 172 formed on the FPC 170 to supply the first power signal, thereby compensating the difference in the voltage drop between the first power source line 150 and the second power source line 154. Thus, the light emitting display according to the first embodiment of the present invention equalizes the voltage drop due to the line resistance of the first power source line 150 with the voltage drop due to the line resistance of the second power source line 154 by using the impedance compensator 174, thereby generating a uniform first power signal regardless of the upper and lower edges of the pixel area 120 respectively adjacent to the first power source line 150 and the second power source line 154.

Thus, the light emitting display according to the first embodiment of the present invention prevents the amount of current corresponding to the same data being signal supplied to separate pixels 21 from varying based on the position of the pixels 121, thereby providing a uniform brightness for each pixel 121. In the light emitting display according to the first embodiment of the present invention, the current distribution may vary due to the difference in the voltage drop between an area adjacent to and an area not-adjacent to the first power source line 150 and the second power source line 154. However, the light emitting display according to the first embodiment of the present invention minimizes a ratio of the maximum current to the minimum current supplied to the pixels 121.

Figure 4:
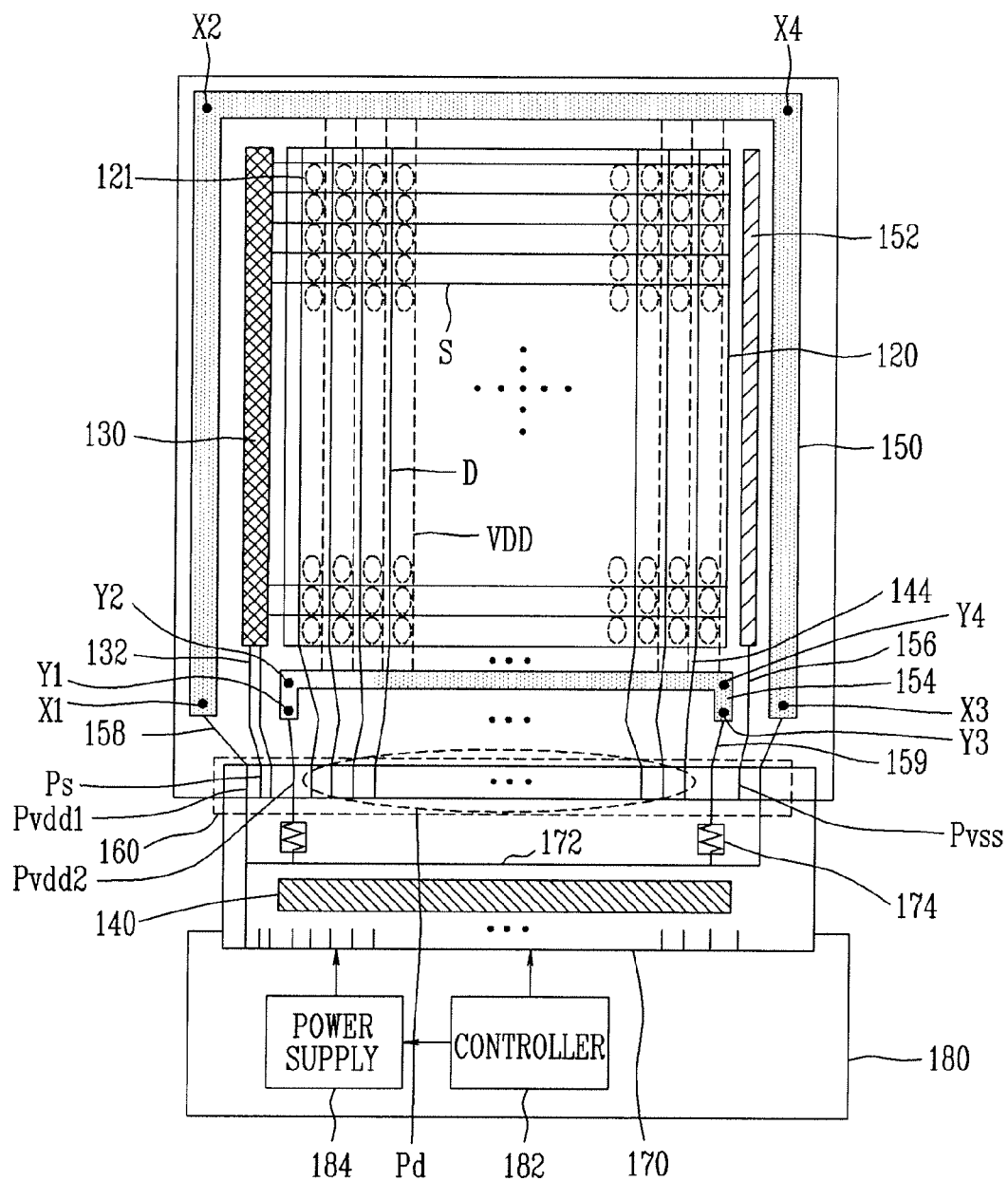
FIG. 4 is a view of a light emitting display according to a second embodiment of the present invention.

FIG. 4 is a view of a light emitting display according to a second embodiment of the present invention.

Referring to FIG. 4, the light emitting display according to the second embodiment of the present invention has the same configuration as that of the first embodiment except the placement of the data driver 140 for supplying a data signal to a data line D of a pixel area 120 has been moved.

The data driver 140 of the light emitting display according to the second embodiment of the present invention can be mounted on an FPC 170 connected to a substrate 110. Thus, the data driver 140 is electrically connected to the data line D of the pixel area 120 through a pad hub 160 of the substrate 110, thereby supplying the data signal. Alternatively, the data driver 140 may be provided on a chip-on-board that is mounted on a printed circuit board (PCB), may be directly mounted as a chip-on-film, or may be mounted on a general film-type connecting device employed in a tape carrier package, as well as mounted on the FPC 170.

Figure 5:
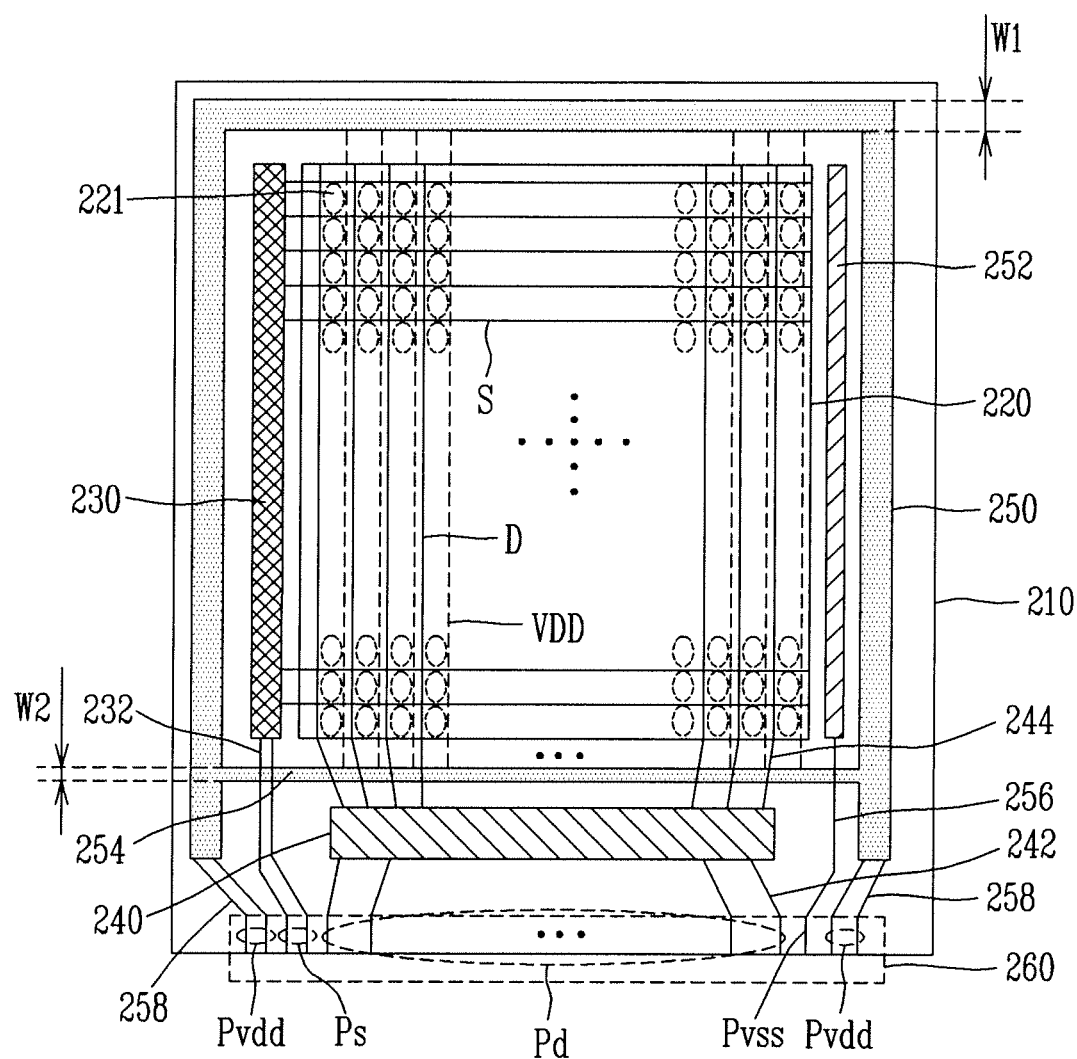
FIG. 5 is a view of a light emitting display according to a third embodiment of the present invention.

FIG. 5 is a view of a light emitting display according to a third embodiment of the present invention.

Referring to FIG. 5, the light emitting display according to the third embodiment of the present invention includes a substrate 210, a pixel area 220 including a plurality of pixels 221 which are arranged in areas defined by data lines D, scan lines S, and pixel power source lines VDD formed on the substrate 210, a scan driver 230, a data driver 240, a first power source line 250 having a first line width W1, a second power source line 254 having a second line width W2, a second power source line 252, and a pad hub 260.

The scan driver 230 is electrically connected to a first set of pads Ps on the pad hub 260 through the scan control signal line 232. The scan driver 230 generates a scan signal along the scan control signal line 232, and transmits the scan signal to the scan lines S of the pixel area 220 in sequence. The scan driver 230 includes a plurality of shift registers to generate the sequential scan signals in response to the scan control signal.

The data driver 240 is electrically connected to a second set of pads Pd on the pad hub 260 through the first data signal line 242, and electrically connected to the data line D through the second data signal line 244. The data driver 240 can be mounted to the substrate 210 by a chip-on-glass method, a wire-bonding method, a flip chip method, a beam lead method, or similarly mounted or directly formed on the substrate 210. The data driver 240 receives the data signal and the data control signal transmitted from the second set of pads Pd, and supplies the data signal corresponding to one horizontal line per one horizontal period to the data lines D on the basis of the data control signal.

The first power source line 250 is formed to have the first line width W1 and to be adjacent to the upper and lateral sides of the pixel area 220 along the edges of the substrate 210 except for the pad hub 260. The opposite ends of the first power source line 250 are electrically connected to a fourth set of pads Pvdd on the pad hub 260 through a first power supply line 258. The first power source line 250 receives the first power signal supplied from a power supply (not shown) through the first power supplying line 258, and supplies the first power signal to the first side of the pixel power source line VDD of each pixel 221.

The second power source line 252 is electrically connected to a cathode electrode of the light emitting device formed on the whole of the pixel area 220. Further, the second power source line 252 receives the second power signal from the third set of pads Pvss through the second power supplying line 256 and supplies the second power signal to the cathode electrode of the light emitting device.

The second power source line 254 is formed to have the second line width W2 and be adjacent to a lower side of the pixel area 220, and electrically connected to the first power source line 250 formed adjacent to the lateral sides of the pixel area 220. The second line width W2 of the second power source line 254 is selected to have the same line resistance as the first power source line 250 has. For example, on assumption that the first power source line 250 and the second power source line 254 have equal thickness, a line resistance R1 of the first power source line 250 and a line resistance R2 of the second power source line 254 should satisfy the following equation 1.

$$R1 = \rho\left(\frac{L}{t \times W1}\right) \quad \text{[equation 1]}$$
$$R2 = \rho\left(\frac{L}{t \times W2}\right)$$

where $\rho$ is conductivity, L is length, and t is thickness.

A resistance per unit length of the first power source line 250 is lower than a resistance per unit length of the second power source line 254. Therefore, the amount of voltage drop caused by the line resistance R2, which depends on the length of the second power source line 254 that has the second line width W2 equal to that caused by the line resistance R1, which depends on the length of the first power source line 250 that has the first line width W1. The second power source line 254 that has the second line width W2 supplies the first power signal from the first power source line 250 to the second side of each pixel power source line VDD.

Each pixel power source line VDD has its first end connected to the first power source line 250 that has the first line width W1 is adjacent to the upper side of the pixel area 220. The second end of each pixel power source line VDD is connected to the second power source line 254 that has the second line width W2 is adjacent to the lower side of the pixel area 220. Each pixel power source line VDD supplies the first power signal from the first power source line 250 that has the first line width W1 and from the second power source line 254 that has the second line width W2 to each pixel 221.

Thus, each pixel 221 is controlled by the scan signal transmitted to the scan line S and emits light corresponding to the current supplied from the pixel power source line VDD to the light emitting device thereof in correspondence with the data signal transmitted on the data line D.

Figure 6:
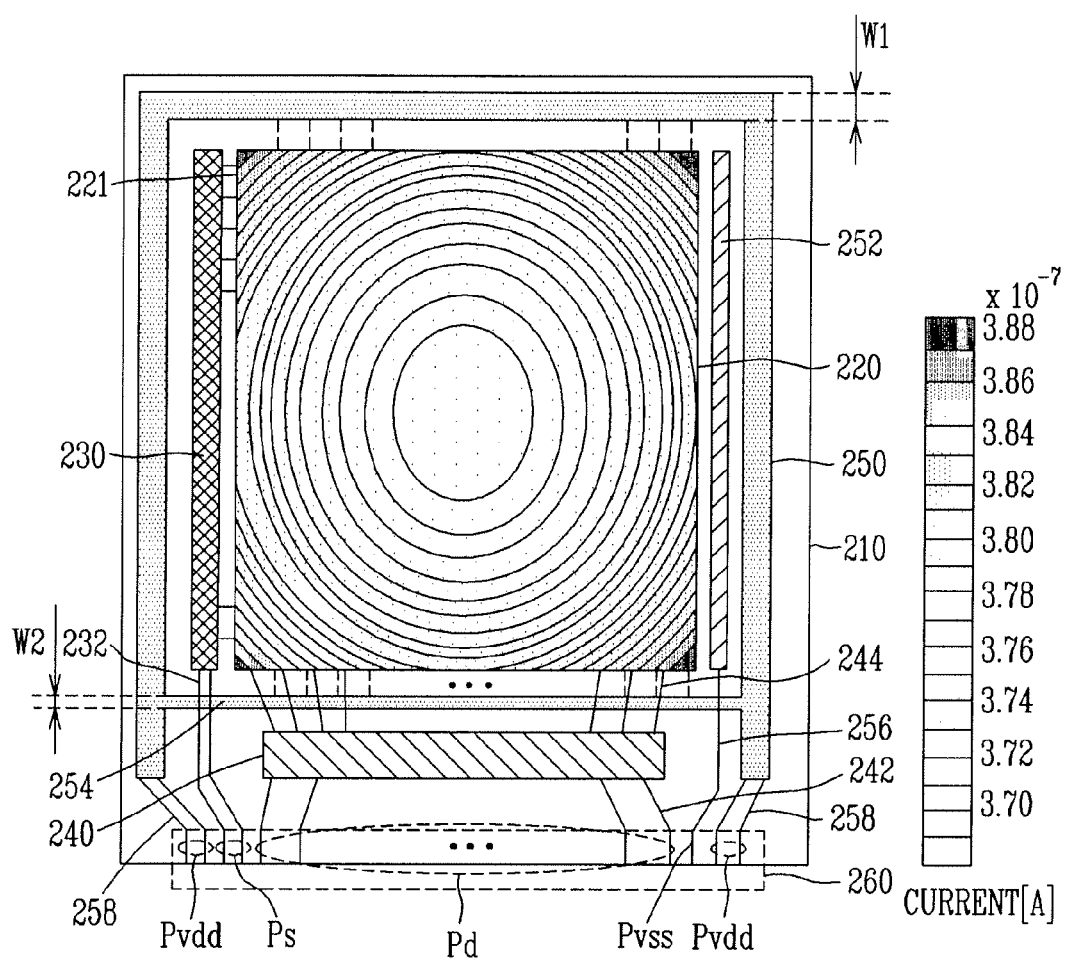
FIG. 6 is a view showing a current distribution according to a position of a pixel in the light emitting display according to the third embodiment of the present invention.

FIG. 6 is a view showing a current distribution according to positions of a pixel in the light emitting display according to the third embodiment of the present invention.

Referring to FIG. 6, in the light emitting display according to the third embodiment of the present invention, the line width W2 of the second power source line 254 is formed to be different from the line width W1 of the first power source line 250, thereby equalizing the line resistance R1 of the first power source line 250 with the line resistance R2 of the second power source line 254 regardless of distance. Thus, the light emitting display according to the third embodiment of the present invention equalizes the first power signal supplied from the first power source line 250 that has the first line width W1 and is connected to the first end of each pixel power source line VDD with the first power signal supplied from the second power source line 254 that has the second line width W2 and is connected to the second end of each pixel power source line VDD.

Therefore, the light emitting display according to the third embodiment of the present invention prevents the amount of current corresponding the same data signal supplied to the respective pixels 221 from varying according to the position of the pixel 221, thereby minimizing non-uniformity in the brightness of each pixel 221. In the light emitting display according to the third embodiment of the present invention, the current distribution may vary due to the difference in the voltage drop between an area adjacent to and an area not-adjacent to the first power source line 250 and the second power source line 254. However, the light emitting display according to the third embodiment of the present invention minimizes a ratio of the maximum current to the minimum current supplied to each pixel 221.

Figure 7:
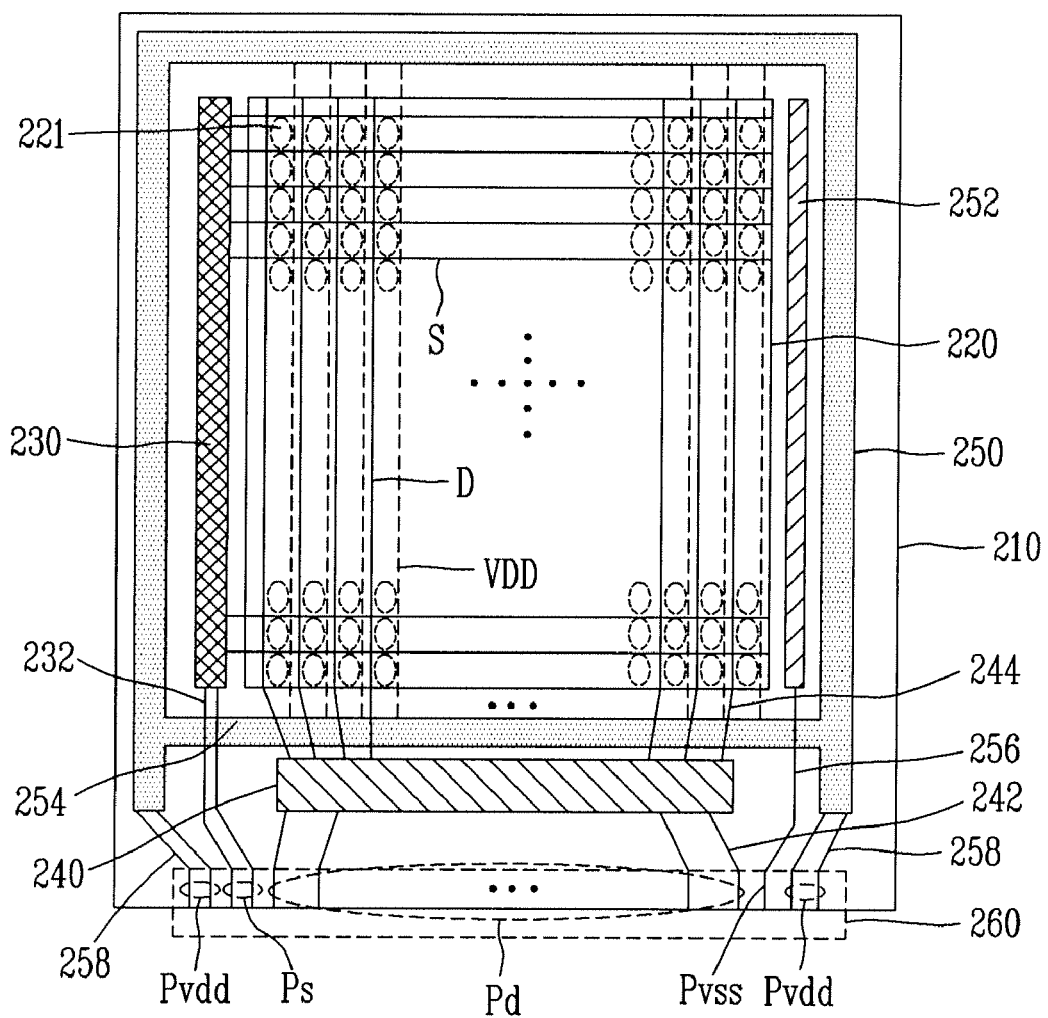
FIG. 7 is a view of a light emitting display according to a fourth embodiment of the present invention.
Figure 8:
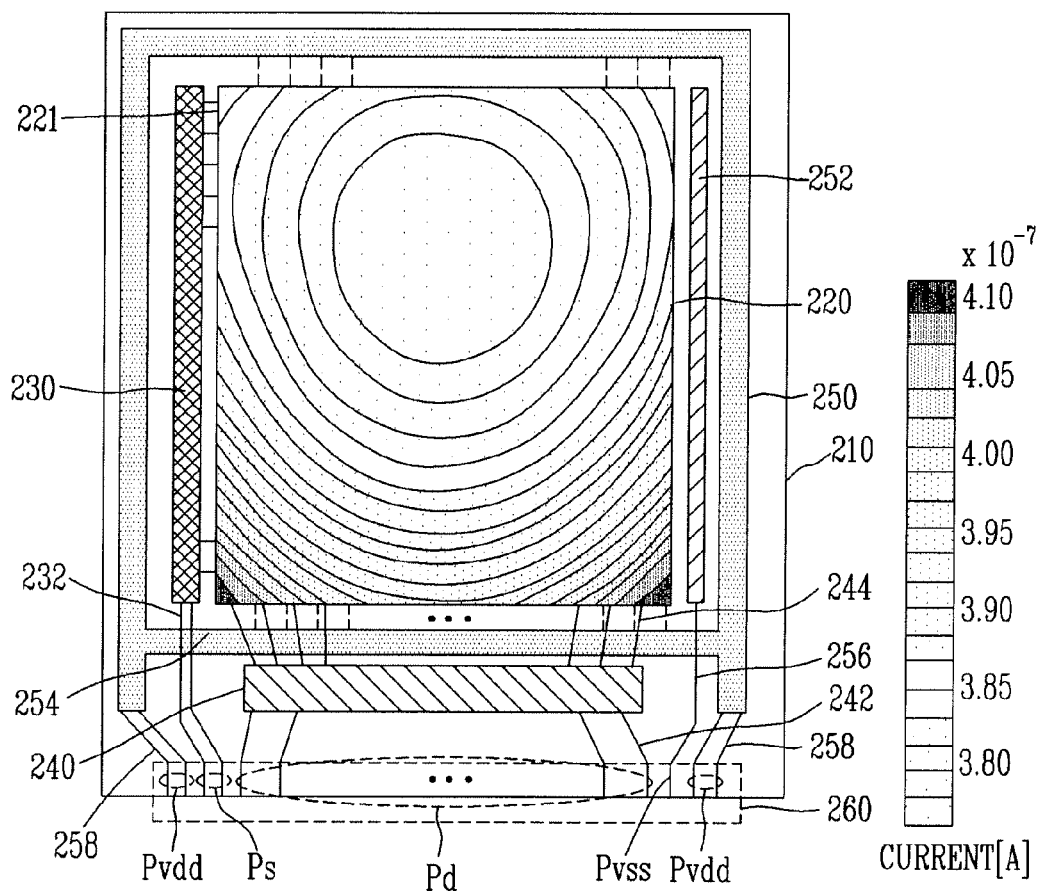
FIG. 8 is a view showing a current distribution according to positions of a pixel provided in the light emitting display according to the fourth embodiment of the present invention.

FIG. 7 is a view of a light emitting display according to a fourth embodiment of the present invention, and FIG. 8 is a view showing a current distribution according to the position of a pixel in the light emitting display according to the fourth embodiment of the present invention.

Referring to FIG. 7, the light emitting display according to the fourth embodiment of the present invention has the same configuration as that of the third embodiment except the first power source line 250 and the second power source line 254 have an equal line width.

When the first power source line 250 and the second power source line 254 have an equal line width, the voltage drop of the first power source line 250 which is relatively far away from the pad hub 260, is larger than that of the second power source line 254 which is relatively close to the pad hub 260. Therefore, there is a difference between the first power signal supplied from the first power source line 250 to the first end of each pixel power source line VDD and the first power signal supplied from the second power source line 254 to the second end of each pixel power source line VDD. In the light emitting display according to the fourth embodiment of the present invention, the first power source line 250 and the second power source line 254 have an equal line width differ in the voltage drop from each other because they have different line resistances dependent on the distance from the pad hub 260.

Therefore, as shown in FIG. 8, an upper portion of the pixel area 220, to which the first power signal is supplied from the first power source line 250, becomes a low voltage region. Further, a lower portion of the pixel area 220, to which the first power signal is supplied from the second power source line 254, becomes a high voltage region. In the light emitting display according to the fourth embodiment of the present invention, the amount of current varies according to positions of each pixel 221 because the pixel power source line VDD has a non-uniform voltage drop with respect to the same data signal according to the positions of each pixel 221, so that the brightness of each pixel is non-uniform.

Thus, the light emitting display according to the fourth embodiment of the present invention may be modified to include the first power source line 250 and the second power source line 254 having different line widths W1 and W2 like that of the third embodiment, thereby minimizing the non-uniformity of the voltage drop in the pixel power source line VDD according to the positions of the pixel 221.

Figure 9:
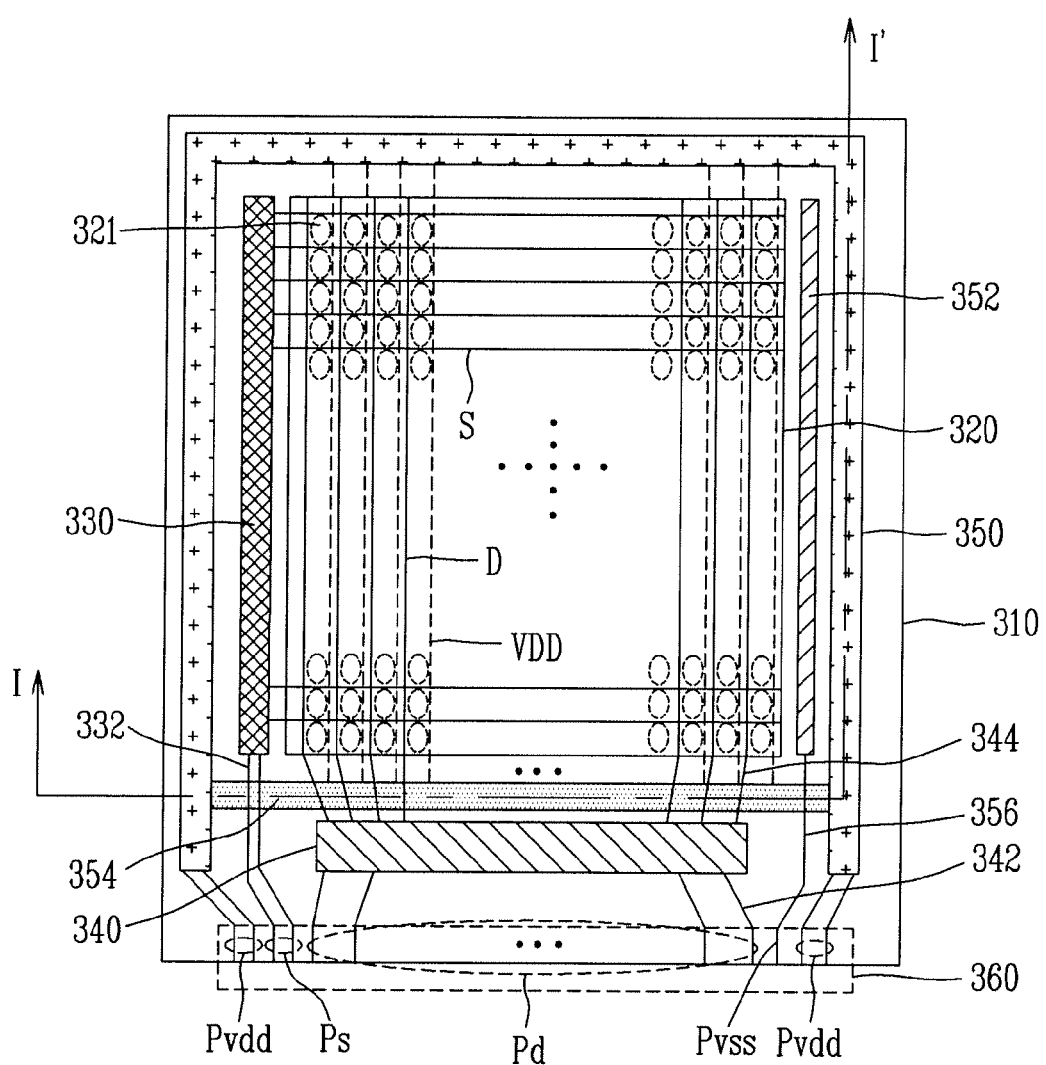
FIG. 9 is a view of a light emitting display according to a fifth embodiment of the present invention.

FIG. 9 is a view of a light emitting display according to a fifth embodiment of the present invention.

Referring to FIG. 9, the light emitting display according to the fifth embodiment of the present invention has the same configuration as that of the third embodiment except that a first power source line 350 and an second power source line 354 are configured differently.

In the light emitting display according to the fifth embodiment of the present invention, the first power source line 350 and the second power source line 354 have an equal line width but have a different number of layers. That is, the first power source line 350 is formed as a plurality of layers, but the second power source line 354 is formed as a single layer. Alternatively, the second power source line 354 may be formed as a plurality of layers and the first power source line 350 may be formed as a single layer.

Figure 10:
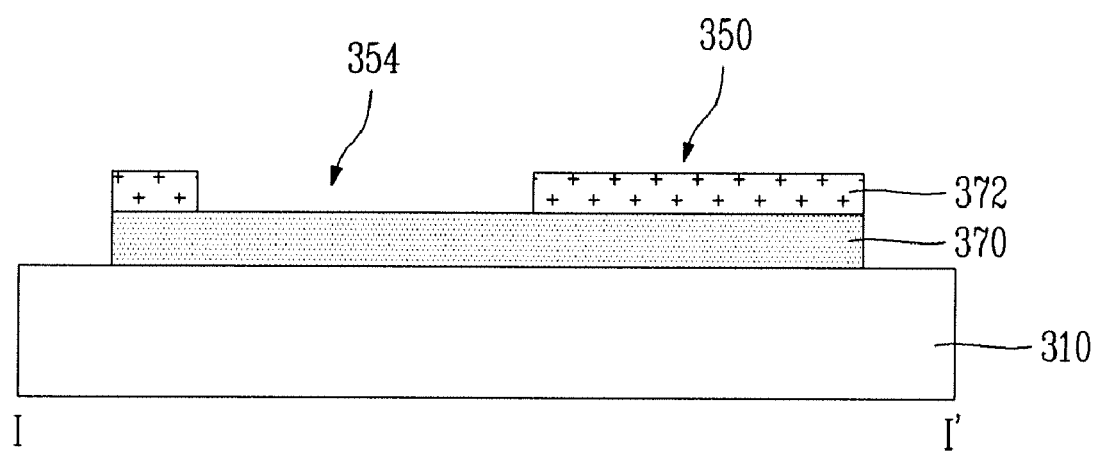
FIG. 10 is a sectional view of the light emitting display, taken along line I-I' of FIG. 9.

FIG. 10 is a sectional view of the light emitting display, taken along line I-I' of FIG. 9.

Referring to FIG. 10, the first power source line 350 includes a first metal layer 370, and a second metal layer 372 formed on the first metal layer 370 and having a different resistance than the first metal layer 370. Thus, the first power source line 350 has a resistance per unit length lower than the second power source line 354.

The first metal layer 370 of the first power source line 350 is made of the same material used in a gate metal layer of a transistor formed on each pixel 321. Material for the first metal layer 370 may include Cr, AlNd, Mo, MoW, Ti, Ta, and similar materials. Generally, when the first metal layer 370 is formed as the gate metal layer, the first metal layer 370 has a resistance per unit length of about $0.77\Omega$.

The second metal layer 372 of the first power source line 350 is made of the same material as used in a source/drain metal layer of the transistor formed in each pixel 321. The second metal layer 372 may be formed as a single layer or a plurality of layers with material having a resistance lower than that of the first metal layer 370, e.g., Cr, AlNd, Mo, MoW, Ti, Ta, or similar materials. Generally, when the second metal layer 372 is formed as the source/drain metal layer, the second metal layer 372 has a resistance per unit length of about 0.28Ω.

The second power source line 354 is made of the same material as used in the first metal layer 370 of the first power source line 350, and receives the first power signal from the first metal layer 370 of the first power source line 350.

Thus, in the light emitting display according to the fifth embodiment of the present invention, the first power source line 350 and the second power source line 354 are different in the number of layers from each other, so that the first power source line 350 and the second power source line 354 have an equal line resistance regardless of distance, thereby equalizing the voltage drop of the first power signal supplied to both the first power source line 350 and the second power source line 354.

Figure 11:
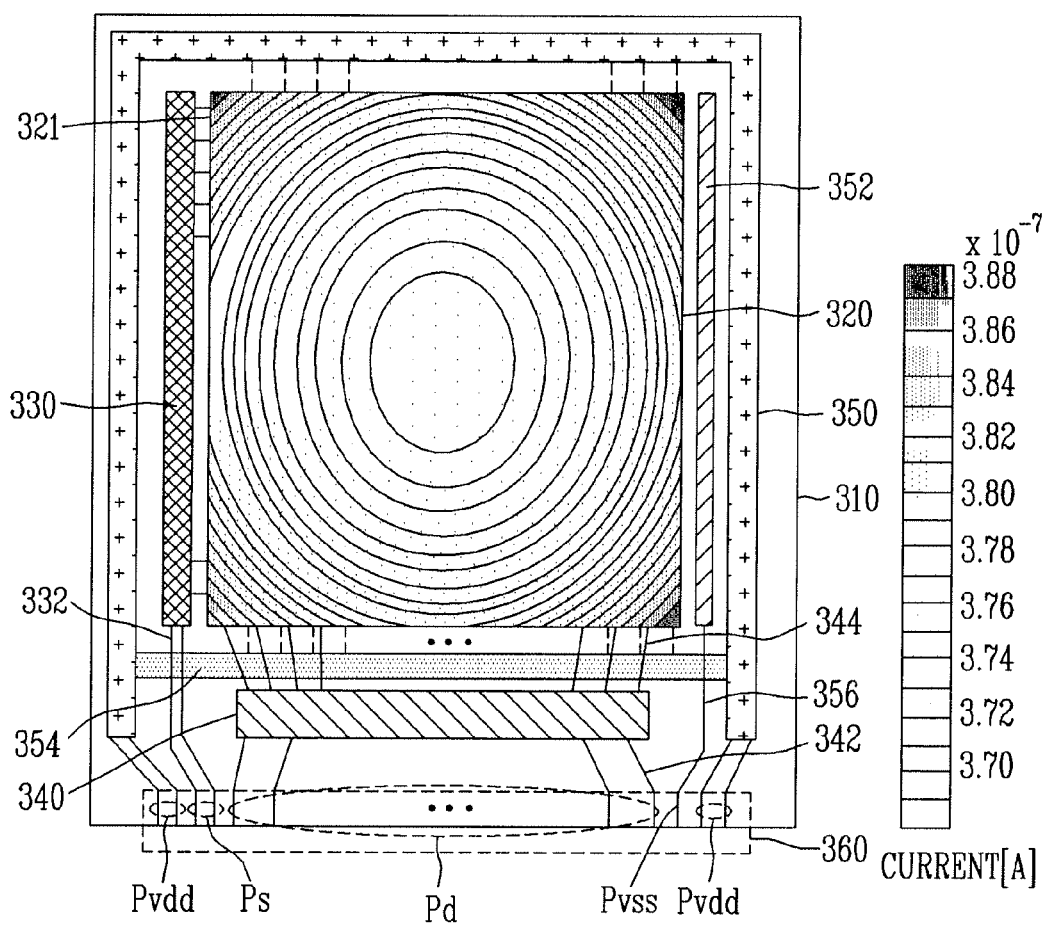
FIG. 11 is a view showing a current distribution according to a position of a pixel in the light emitting display according to the fifth embodiment of the present invention.

FIG. 11 is a view showing a current distribution according to a position of a pixel in the light emitting display according to the fifth embodiment of the present invention.

Referring to FIG. 11, the light emitting display according to the fifth embodiment of the present invention equalizes the first power signal supplied from the first power source line 350, which is formed as a plurality of layers and connected to the first end of the plurality of pixel power source lines VDD with the first power signal supplied from the second power source line 354 formed as a single layer and connected to the second end of the plurality of pixel power source lines VDD. Thus, the light emitting display according to the fifth embodiment of the present invention prevents the amount of current for the same data signal supplied to different pixels 321 from varying according to the positions of the pixel 321, thereby providing a uniform brightness for each pixel 321. In the light emitting display according to the fifth embodiment of the present invention, the current distribution may vary due to the difference in the voltage drop between an area adjacent to and an area not-adjacent to the first power source line 350 and the second power source line 354. However, the light emitting display according to the fifth embodiment of the present invention minimizes a ratio of the maximum current to the minimum current supplied to each pixel 321.

Figure 12:
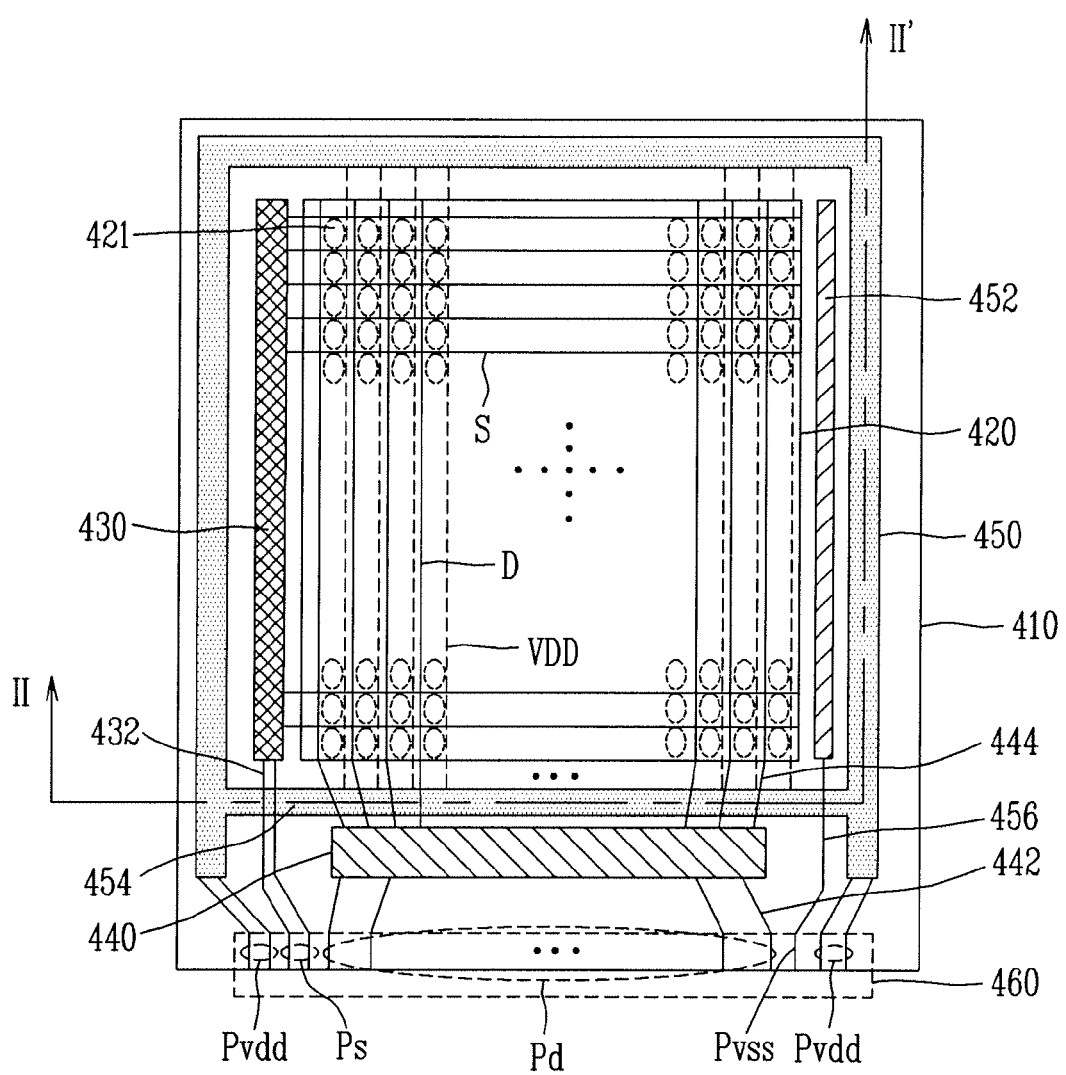
FIG. 12 is a view of a light emitting display according to a sixth embodiment of the present invention.

FIG. 12 is a view of a light emitting display according to a sixth embodiment of the present invention.

Referring to FIG. 12, the light emitting display according to the sixth embodiment of the present invention has the same configuration as that of the third embodiment except for the configuration of the first power source line 450 and the second power source line 454.

In the light emitting display according to the sixth embodiment of the present invention, the first power source line 450 and the second power source line 454 have an equal line width but have different first and second thicknesses. Therefore, the line resistance per unit length of the first power source line 450 is selected to be lower than the line resistance per unit length of the second power source line 454.

Figure 13:
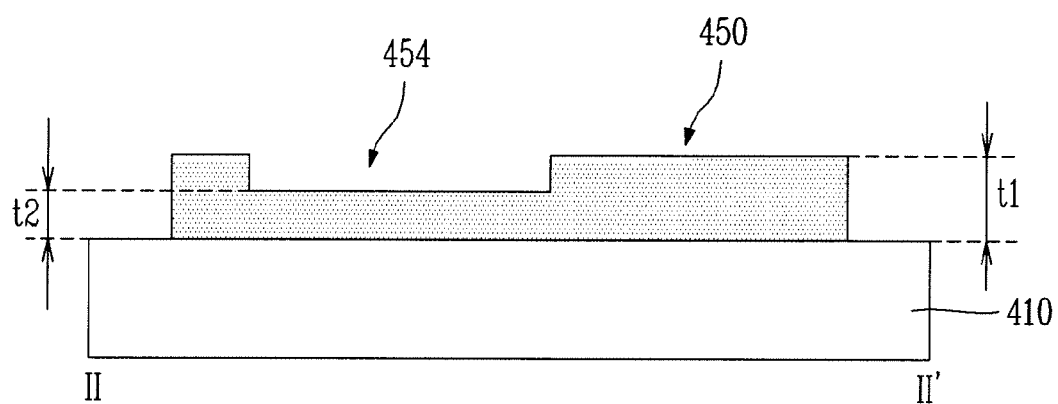
FIG. 13 is a sectional view of the light emitting display, taken along line II-II' of FIG. 12.

FIG. 13 is a sectional view of the light emitting display, taken along line II-II' of FIG. 12.

Referring to FIG. 13, the first thickness t1 for the first power source line 450 is greater than the second thickness t2 of the second power source line 454. In other words, the second thickness t2 of the second power source line 454 is less than the first thickness t1 of the first power source line 450. The first thickness t1 of the first power source line 450 is selected to equalize the line resistance second power source line 454 with the line resistance of the first power source line 450 taking into account the length of each line. For example, the first power source line 450 may have a first thickness t1 of about 5,000 Å. A source/drain metal layer of a transistor formed on each pixel 421 may be made of Cr, AlNd, Mo, MoW, Ti, Ta, or similar materials. The second power source line 454, in one embodiment, has a thickness t2 of about 3,000 Å.

Thus, in the light emitting display according to the sixth embodiment of the present invention, the first power source line 450 and the second power source line 454 have different thicknesses from each other, so that the first power source line 450 and the second power source line 454 are equalized in line resistance regardless of length of either line, thereby equalizing the voltage drop of the first power signal supplied to both the first power source line 450 and the second power source line 454.

Figure 14:
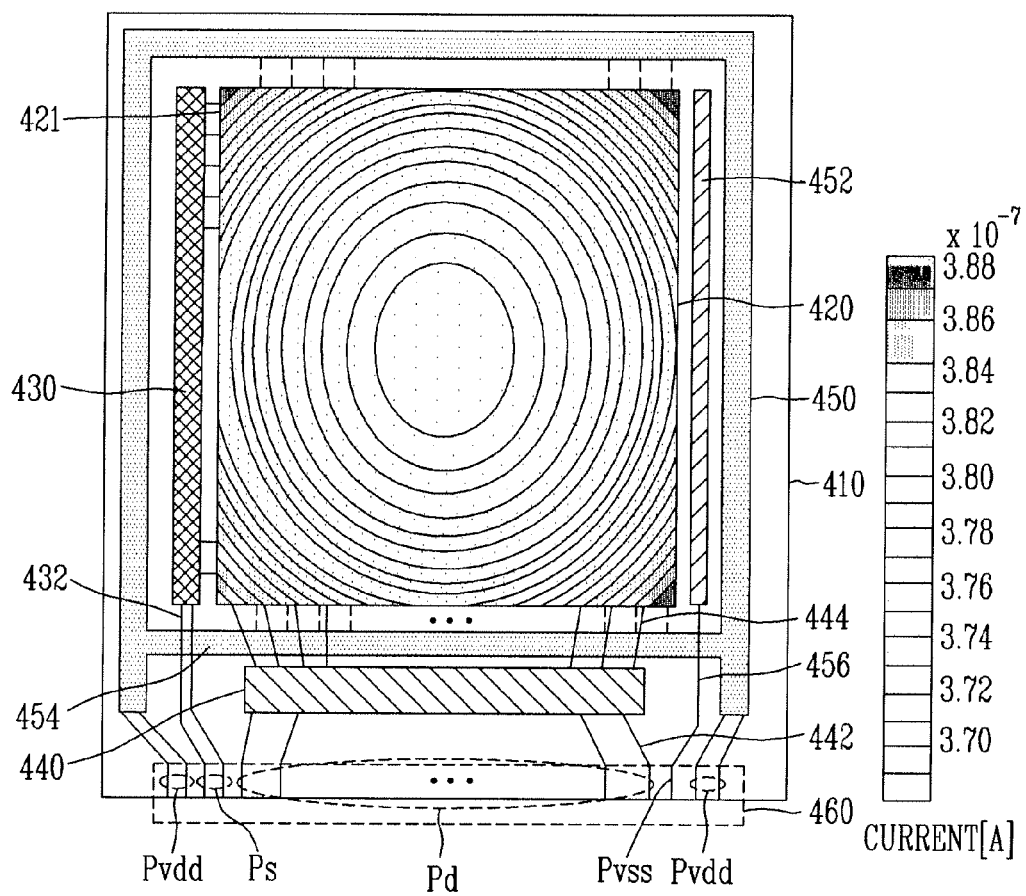
FIG. 14 is a view showing a current distribution according to a position of a pixel in the light emitting display according to the sixth embodiment of the present invention.

FIG. 14 is a view showing a current distribution according to positions of a pixel provided in the light emitting display according to the sixth embodiment of the present invention.

Referring to FIG. 14, the light emitting display according to the sixth embodiment of the present invention equalizes the first power signal supplied from the first power source line 450 having the first thickness t1 to the first end of the plurality of pixel power source lines VDD with the first power signal supplied from the second power source line 454 having the second thickness t2 to the second end of the plurality of pixel power source lines VDD. Thus, the light emitting display according to the sixth embodiment of the present invention prevents the amount of current corresponding the same data signal supplied to the respective pixels 421 from varying based on the position of the pixel 421, thereby providing a uniform brightness for each pixel 421. In the light emitting display according to the sixth embodiment of the present invention, the current distribution may vary due to the difference in the voltage drop between an area adjacent to and an area not-adjacent to the first power source line 450 and the second power source line 454. However, the light emitting display according to the sixth embodiment of the present invention minimizes a ratio of the maximum current to the minimum current supplied to each pixel 421.

Figure 15:
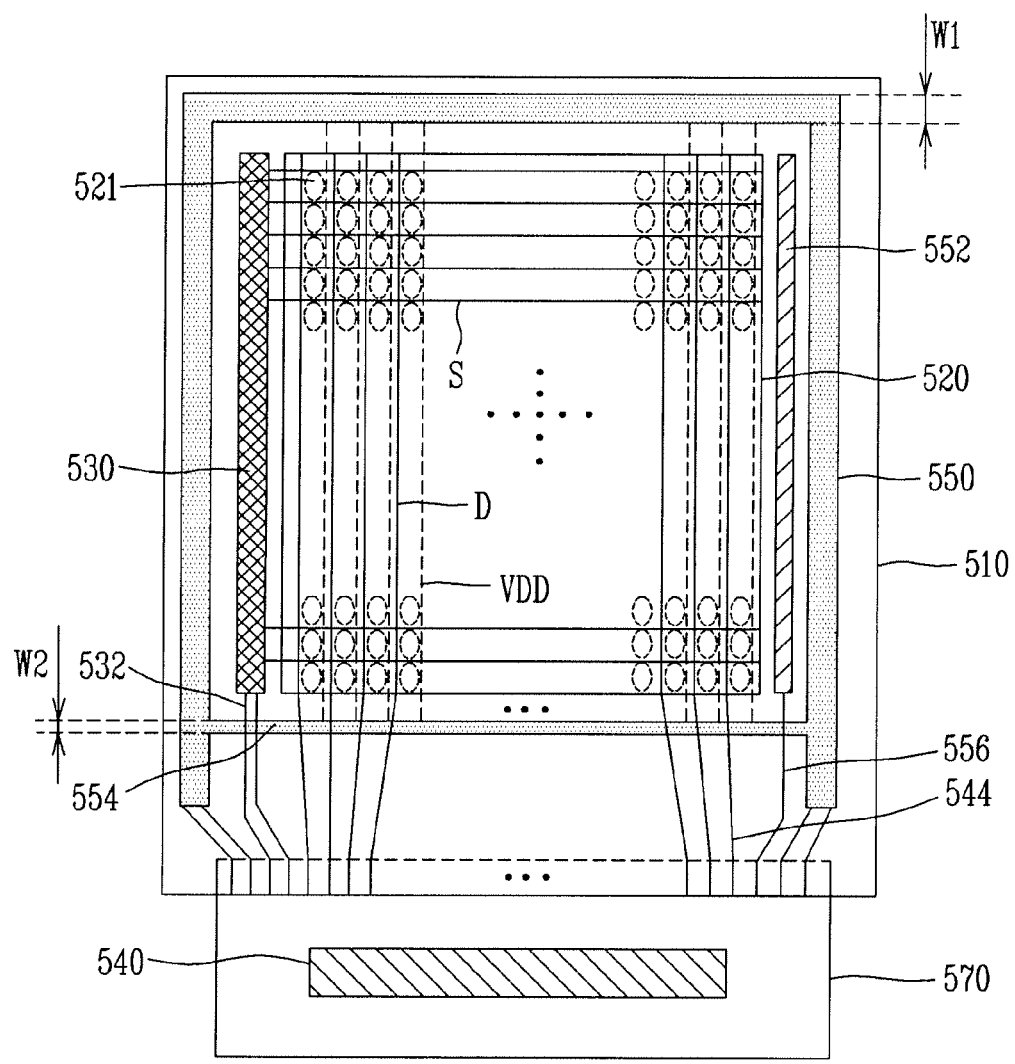
FIG. 15 is a view of a light emitting display according to a seventh embodiment of the present invention.

FIG. 15 is a view of a light emitting display according to a seventh embodiment of the present invention.

Referring to FIG. 15, the light emitting display according to the seventh embodiment of the present invention has the same configuration as those of the third through sixth embodiments except the configuration of data driver 540 for supplying a data signal to a data line D of a pixel area 520 is altered.

The data driver 540 of the light emitting display according to the seventh embodiment of the present invention can be mounted on an FPC 570 connected to a substrate 510. Thus, the data driver 540 is electrically connected to the data line D of the pixel area 520 through a pad hub of the substrate 510, thereby supplying the data signal to the data line D of the pixel area 520. Alternatively, the data driver 540 may be provided on a chip-on-board mounted on a printed circuit board (PCB), may be directly mounted on a chip-on-film, or may be mounted on a general film-type connecting device employed in a tape carrier package, as well as mounted on the FPC 570.

As described above, the present invention provides a light emitting display, which equalizes a voltage drop due to a line resistance that varies depending on the length of a second power source line that supplies a first power signal to a lower end of a pixel area with a voltage drop due to line resistance that varies depending on the length of a first power source line that supplies the first power signal to an upper end of the pixel area, thereby minimizing the voltage drop of the first power signal supplied to pixels. Thus, the present invention minimizes non-uniformity of brightness due to the voltage drop differences caused by the lengths of the power source lines supplying the first power signal to each pixel.

Further, the present invention provides a light emitting display, in which a first power source line and a second power source line are formed to be different in line width, the number of layers, and thickness from each other, thereby allowing the first power source line and the second power source line to be equalized in line resistance. Thus, the present invention prevents picture quality of the light emitting display from being deteriorated due to difference in the voltage drop between the first power source line and the second power source line.

Although a few exemplary embodiments of the present invention have been shown and described, it would be appreciated by those skilled in the art that changes might be made to these embodiments without departing from the principles and spirit of the embodiments of the invention, the scope of which is defined in the claims and their equivalents.

What is claimed is:

1. A light emitting display comprising:
   a pixel area formed on a substrate comprising a plurality of pixels defined by scan lines and data lines;
   a first power source line to supply a first power signal to each pixel on a first side of the pixel area; and
   a second power source line to supply the first power signal to each pixel on a second side of the pixel area,
   wherein, the first power source line and the second power source line have a different number of layers from each other, wherein the second power source line includes the same material as used in the first metal layer, and wherein the first power source line and the second power source line are different in thickness from each other.

2. The light emitting display according to claim 1, wherein the first power source line is formed along edges of the substrate except the second side and supplies the first power signal to the pixel at a relatively long distance from the substrate, and
   the second power source line is formed at a relatively short distance from the substrate to be adjacent to the second side of the pixel area and electrically connected to the first power source line.

3. The light emitting display according to claim 2, wherein the line width of the first power source line is greater than that of the second power source line.

4. The light emitting display according to claim 1, further comprising:
   a plurality of pixel power source lines electrically connected between the first power source line and the second power source line for supplying the first power signal from the first power source line and the second power source line to each pixel; and
   a second power source line to supply second power different from the first power to the pixel.

* * * * *